(12) United States Patent
Kino et al.

(10) Patent No.: US 6,622,680 B2
(45) Date of Patent: Sep. 23, 2003

(54) AIR INTAKE DUCT AND MANUFACTURING METHOD THEREFOR

(75) Inventors: Hitoshi Kino, Nishikasugai-gun (JP); Yutaka Ogasawara, Nishikasugai-gun (JP); Shinji Ito, Nishikasugai-gun (JP); Yoshikazu Hirose, Nishikasugai-gun (JP); Takahiro Komori, Nishikasugai-gun (JP); Tadashi Kawahara, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/858,501

(22) Filed: May 17, 2001

(65) Prior Publication Data

US 2003/0062013 A1 Apr. 3, 2003

(30) Foreign Application Priority Data

May 17, 2000 (JP) .............................. 2000-144930
May 26, 2000 (JP) .............................. 2000-156420
Jul. 18, 2000 (JP) .............................. 2000-217330

(51) Int. Cl.$^7$ .............................................. F02M 35/10
(52) U.S. Cl. ............................. 123/184.21; 123/184.57
(58) Field of Search ....................... 123/184.21, 184.61, 123/184.56, 184.57, 184.53; 181/204, 229, 293, 294

(56) References Cited

U.S. PATENT DOCUMENTS 3,920,095 A * 11/1975 Clark .......................... 181/248
5,723,828 A * 3/1998 Nakagawa .................... 181/250
5,913,295 A * 6/1999 Sadr et al. .................... 123/198 E
6,155,224 A * 12/2000 Akihisa et al. ............... 123/184.57

FOREIGN PATENT DOCUMENTS

| JP | 63-285258 A | * 11/1988 | ............ 123/184.53 |
| JP | 64-22866 | 2/1989 | |
| JP | 3-43576 | 4/1991 | |
| JP | 11-343938 | 12/1999 | |

OTHER PUBLICATIONS

"Development of Low Noise Intake System with Unreflective Duct (Part 2)", Hirose et al, May 24, 2000.

* cited by examiner

Primary Examiner—Henry C. Yuen
Assistant Examiner—Hyder Ali
(74) Attorney, Agent, or Firm—Posz & Bethards, PLC

(57) ABSTRACT

An opening long in the longitudinal direction of a duct wall is formed. The whole of the opening is covered with non-woven fabric, and the lateral width of the opening is set to be not shorter than 1/20 of the circumferential length of the duct wall. Alternatively, a porous member is thermally welded with the head of an opening of a small cylindrical portion projecting from the duct wall of a duct body 1, while the duct body is prevented from deformation. In a method for manufacturing the air take duct, a high-melting molded piece is brought into contact with a hot plate so as to be heated. A low-melting molded piece is disposed at a distance from the hot plate so as to be heated by radiation heat from the hot plate.

17 Claims, 10 Drawing Sheets

AIR INTAKE DUCT AND MANUFACTURING METHOD THEREFOR

BACKGROUND OF THE INVENTION

1. Field of the Invention

The present invention relates to an air intake duct as a passageway for supplying the air to an engine, and a method for manufacturing such an air intake duct, and particularly relates to an air intake duct in which noise is reduced at the time of air intake and a method for manufacturing such an air intake duct. The present invention also relates to a method for welding resin molded pieces with each other by use of a hot plate, and particularly relates to a hot plate welding method for welding molded pieces which are made of different kinds of resins different in melting point, by use of a hot plate.

The present application is based on Japanese Patent Applications No. 2000-144930, 2000-156420, and 2000-217330, which are incorporated herein by reference.

2. Description of the Related Art

In an air intake system of a motorcar engine, there is a problem that noise is generated in an air cleaner hose, an air intake duct, or the like, at the time of air intake. Such an air intake noise is harsh on the ears particularly at the time of a low engine speed. Conventionally, therefore, a side branch 101 and/or a resonator 102 are provided in an air intake duct 100 so as to reduce noise of a specific frequency calculated on the basis the Helmholtz resonance theory or the like, as shown in FIG. 17.

However, the side branch 101 may reach about 30 cm in length at the longest, and the resonator 102 may reach 14 liters in volume at the largest. Thus, there is a problem that such a noise absorbing apparatus occupies a large space in an engine room so as to reduce the degree of freedom in mounting other parts.

Therefore, Unexamined Japanese Utility Model Publication No. Sho. 64-22866 discloses that an orifice is disposed in an air intake duct and an air intake passageway is narrowed in the position of the orifice so as to reduce air intake noise. By narrowing the air intake passage way in such a manner, the acoustic mass increases so that the air intake noise in a bass range can be reduced.

In addition, Unexamined Japanese Utility Model Publication No. Hei. 3-43576 discloses an air intake noise reducing apparatus comprising two air intake ducts connected in parallel in an air cleaner case, branch ducts branching from the two air intake ducts respectively, a common resonator to which the respective branch ducts are connected, and an on-off valve provided on the upstream side of a connection portion of a branch duct in one of the air intake ducts, the on-off valve being opened selectively in accordance with the running condition of an engine.

According to the apparatus disposed in the aforementioned 3-43576, the on-off valve is controlled to change over the number of air intake ducts between one and two in accordance with the engine speed. Thus, the intake air quantity can be controlled in accordance with the engine speed, and the air intake noise can be reduced.

However, in the aforementioned method in which the air intake passageway is narrowed, there is a problem that the intake air quantity is insufficient at a high engine speed so that the output is lowered.

In addition, in the apparatus disclosed in the aforementioned 3-43576, an electronic control circuit, an electromagnetic on-off valve, a diaphragm actuator, or the like, is used to drive the on-off valve. That is not desirable from the point of view of the cost. In addition, because the electronic control circuit, the electromagnetic on-off valve, or the like, is required, the apparatus becomes so complicated that it is not only expensive but also considerable in the number of man-hour for maintenance.

Therefore, Unexamined Japanese Patent Publication No. Hei. 11-343938 discloses an air intake duct formed of non-woven fabric containing thermoplastic resin fibers by thermal compression molding. By forming an air intake duct out of a non-woven molded body in such a manner, it is possible to reduce the air intake noise effectively. In addition, in the same publication, there is a statement that the following three can be considered as the reason why the air intake noise is reduced, and it is considered that the air intake noise is reduced by the synergistic effect of the three reasons.

(1) Since the non-woven fabric is an elastic body, the non-woven fabric has a vibration damping operation, and sound waves are restrained from being generated by vibrations of duct walls.

(2) Energy of sound waves entering a large number of gaps among the fibers of the non-woven fabric is weakened by the operation of the viscosity and heat conduction of the gaps, and the fibers themselves resonate with the fluctuation of sound pressure so that the sound energy is attenuated.

(3) At least a part of the duct walls have some degree of permeability. Since a part of the sound waves pass such duct walls, stationary waves are restrained from being generated.

There is, however, a problem that the non-woven fabric molded body is so expensive, in comparison with general resin molded bodies, that the air intake duct formed of the non-woven fabric molded body becomes much more expensive than conventional air intake ducts.

By the way, resin molded articles are used in various fields because they have properties that they do not corrode or rot as metal or wood does, and they are inexpensive and light in weight. In addition, most of resin molded articles are formed of thermoplastic resin in order to save global resources by recycling. Then, various molding methods such as compression molding, transfer molding, injection molding, extrusion molding, blow molding, and so on, are used. With the advance of molding machines and mold structures, resin molded articles having complicated shapes have been able to be molded easily.

However, there is a case that it is still difficult to manufacture a molded article having a complicated shape by molding at a time. In addition, it is often necessary to form parts of a molded article out of different kinds of resins. In such a case, a plurality of molded pieces are molded respectively, and thereafter integrated by welding.

Welding resin molded pieces is performed as follows. That is, joint surfaces of a pair of molded pieces to be welded are heated. The molded pieces are brought into pressure contact in the condition that at least one of the joint surfaces is melted. In that state, both the molded pieces are cooled. As the method of heating the joint surfaces, there are known a method using a heated hot plate; a method in which a pair of molded pieces are subjected to vibration in the condition that they are brought into pressure contact with each other, so that they are heated by frictional heat; and so on. The former is called a hot plate welding method, and the latter is called a vibration welding method. Further, a method for vibrating molded pieces by use of ultrasonic vibration is called an ultrasonic welding.

Of such welding methods, the hot plate welding method is carried out as follows. In this method, joint surfaces of a pair of molded pieces to be welded with each other are brought into contact with the surfaces of a hot plate heated to a temperature not lower than softening points of the molded pieces so that the molded pieces are melted. After the hot plate is removed, the joint surfaces of the pair of molded pieces are brought into pressure contact with each other, and cooled in that condition. Since the hot plate welding method is simple in equipment and easy in welding, it is used broadly especially.

However, when molded pieces formed of resins different in melting point are welded with each other by use of the hot plate welding method, there may arise a failure. For example, to weld two molded pieces having a large difference in melting point from each other, it is necessary to heat the hot plate to a temperature not lower than the melting point of the higher-melting molded piece. If both the molded pieces are brought into contact with such a hot plate, the lower-melting molded piece may be melted in a portion other than the joint portion thereof, or softened and deformed even if it is not melted.

Even if there is a small difference in melting point, there may arise a failure. For example, when non-woven fabric made of low-melting thermoplastic resin fibers is welded with an opening portion of a cylindrical molded piece made of high-melting thermoplastic resin without damaging the air permeability of the non-woven fabric, ex. in the manufacturing method of the aforementioned air intake duct, it is desired to do as follows. That is, the non-woven fabric is prevented from melting while the circumferential edge portion of the opening portion of the molded article is melted. In this condition, the non-woven fabric is impregnated with the molten resin so as to be welded therewith. In this case, if the non-woven fabric is not heated to some extent, the molten resin is cooled so that the impregnation becomes insufficient to cause a failure in joint. However, if heating is performed by the conventional hot plate welding method, there is a problem that the non-woven fabric is also melted so that the air permeability is damaged.

To solve such a problem, for example, it is necessary to perform welding as shown in FIG. 18. In FIG. 18, hot plates A and B are formed to sandwich a thermal insulating plate 400 therebetween so that the hot plate B will be higher in temperature than the hot plate A. Then, a molded piece 200 made of low-melting resin is brought into contact with the hot plate A while a molded piece 300 made of high-melting resin is brought into contact with the hot plate B. Thus, the heating temperatures of the hot plates A and B are selected suitably so that the aforementioned problem can be prevented.

However, in the aforementioned method, two hot plates are required. Alternatively, the surface temperatures can be indeed set by one hot plate respectively, but the hot plate increases in size. Further, to control the surface temperatures of the hot plate, it is necessary to provide sensors and temperature regulators for the respective surfaces. Thus, there is a problem that the welder becomes large in size, the cost increases, and there is a severe restriction from the point of view of the space where the welder is installed.

SUMMARY OF THE INVENTION

The present invention was developed in consideration of such circumstances. It is an object of the present invention to dispose a porous member such as non-woven fabric most suitably to thereby not only suppress air intake noise but also reduce the usage of the non-woven fabric so as to make an air intake duct inexpensive.

It is another object of the present invention to reduce the loss in intake pressure in an air intake duct. It is still another object of the present invention to manufacture such an air intake duct stably while the porous member is thermally welded to the opening of the duct body uniformly so as to enhance the welding strength.

Further, it is still another object of the present invention to provide a method in which resin molded pieces different in melting point can be welded with each other by one hot plate at low cost without making a welder larger in size.

It is still another object of the present invention to provide a method in which non-woven fabric made of thermoplastic resin fibers is welded with a molded piece having a higher melting point than the non-woven fabric at low cost without damaging the air permeability of the non-woven fabric.

According to the first aspect of the present invention, there is provided a method for an air intake duct to be disposed between an outside air intake port of a motor car and an intake manifold of an engine, comprising: a duct wall having an opening formed in a predetermined portion of the duct wall, the opening being long in a longitudinal direction of the duct wall, a whole of the opening being covered with a porous member, the opening having a lateral width which is not shorter than $1/20$ of circumferential length of the duct wall.

A longitudinal position of the opening is preferably set to overlap with an antinode of a generated resonant wave. A longitudinal center of the opening is preferably located in a position of $1/4$ of whole length of the duct wall from an end portion of the duct wall. The longitudinal center of the opening is preferably located in a position of $1/4$ of whole length of the duct wall from an end portion of the duct wall in opposition to the outside air intake port.

According to the second aspect of the present invention, there is provided an air intake duct comprising: a duct body constituted by a large cylindrical portion made of resin and a small cylindrical portion projecting outward from a part of a duct wall of the large cylindrical portion, the small cylindrical portion having an opening formed at a head of the small cylindrical portion to thereby make the inside of the large cylindrical portion communicate with the outside of the large cylindrical portion; and a porous member covering a head of the opening of the small cylindrical portion.

According to the third aspect of the present invention, there is provided a method for manufacturing an air intake duct, comprising: forming a duct body constituted by a large cylindrical portion made of resin and a small cylindrical portion projecting outward from a part of a duct wall of the large cylindrical portion, the small cylindrical portion having an opening at a head of the small cylindrical portion to thereby make the inside of the large cylindrical portion communicate with the outside of the large cylindrical portion; and thermally welding a porous member containing a thermoplastic material with the small cylindrical portion so as to cover the opening.

Preferably, the small cylindrical portion optionally has a flange portion formed at a head of the opening, a reception jig is inserted between the duct wall of the large cylindrical portion and the flange portion, and pressure is applied to the porous member and the flange portion by a pressure jig and the reception jig so that the porous member is thermally welded with the flange portion.

According to the fourth aspect of the present invention, there is provided a hot plate welding method for welding first and second molded pieces by use of the a hot plate, which is applicable to manufacturing the air intake duct, the first molded piece being made of first resin, the second molded piece being made of second resin having a higher melting point than the first resin, the method comprising: bringing a joint surface of the second molded piece into contact with a surface of the hot plate heated to a temperature not lower than the melting point of the second resin so as to heat the joint surface of the second molded piece, while disposing the first molded piece in opposition to the other surface of the hot plate and away from the other surface so as to heat a joint surface of the first molded piece by radiation heat from the hot plate; and bringing the first and second molded pieces into pressure contact with each other in a condition that at least the joint surface of second molded piece is melted, so that the first and second molded pieces are welded with each other.

The first molded piece may be a cloth formed of fibers made of the first resin, and be impregnated with molten resin in the joint surface of the second molded piece so that the first and second molded pieces are welded with other.

In a hot plate welding method according to the present invention, the joint surface of a second molded piece having a high melting point is brought into contact with a hot plate heated to a temperature not lower than the melting point of the second molded piece, so as to be heated, in the same manner as that in the conventional case. Accordingly, the second molded piece can be melted and welded in the same manner as that in the conventional case. On the other hand, a first molded piece having a low melting point is disposed at a fixed distance from the hot plate so that the joint surface of the first molded piece is heated by radiation heat from the hot plate. The radiation heat becomes smaller as the distance between the hot plate and the first molded piece becomes larger. Accordingly, the heating state of the first molded piece can be controlled desirably by setting a desired distance between the first molded piece and the hot plate. Thus, the first molded piece can be heated to a temperature high enough to be welded but low enough to be prevented from deformation caused by softening. In this state, the hot plate is removed, and the first and second molded pieces are brought into pressure contact with each other and cooled. Thus, welding is completed.

Assume that the first molded piece is a cloth formed of fibers made of first resin having a low melting point. Then, the first molded piece is heated by the radiation heat from the hot plate so that the first molded piece can be heated to a temperature high enough to be impregnated with the molten resin of the melting joint surface of the second molded piece. Thus, the first molded piece can be welded with the first molded piece. In addition, the temperature of the first resin is low enough to prevent the joint surface of the first molded piece from melting. Thus, there is no fear that the first molded piece is softened and deformed. Accordingly, the first molded piece can be welded without damaging its air permeability. That is, when the second molded piece has a cylindrical shape with an opening, the first molded piece can be bonded with the opening to cover the opening. Thus, the opening can be covered while the air permeability of the first molded piece is ensured.

There is no special limit in the difference in melting point between the first and second resins. It will go well if the melting point of the second resin is higher than that of the first resin. In addition, as for the materials of the first and second resins, it will go well if both the resins are thermoplastic resins, and they are of materials capable of being welded with each other in the case where normal molded pieces are welded. Further, there is no special limit in the shapes of the first and second molded pieces.

The first molded piece may be a cloth formed of fibers made of first resin. Examples of such cloths include woven fabric, non-woven fabric, knitted fabric, and so on. The degree of air permeability of the first molded piece may be determined in accordance with the purpose. Of such cloths, non-woven fabric is preferably used because it is easy to manufacture. If the first molded piece is a cloth, a fibrous aggregate body, or the like, formed of fibers made of the first resin, the first resin does not have to be capable of being thermally welded with the second resin. If the fibers are impregnated with the molten second resin and the molten second resin is solidified among the fibers, the first and second molded pieces can be bonded by the anchor effect. This case is also included in "welding" defined according to the present invention.

The distance between the joint surface of the first molded piece and the hot plate is determined in accordance with the temperature of the hot plate, the time of contact between the second molded piece and the hot plate, the melting point of the first resin, the atmospheric temperature, and so on. On the other hand, the heating time by radiation heat from the hot plate is determined in accordance with the temperature of the hot plate, the time of contact between the second molded piece and the hot plate, the distance between the first molded piece and the hot plate, the melting point of the first resin, the atmospheric temperature, and so on. Generally, the heating time becomes shorter if the distance is shorter, and the heating time becomes longer if the distance is longer.

Features and advantages of the invention will be evident from the following detailed description of the preferred embodiments described in conjunction with the attached drawings.

DETAILED DESCRIPTION OF THE PREFERRED EMBODIMENTS

Figure 1:
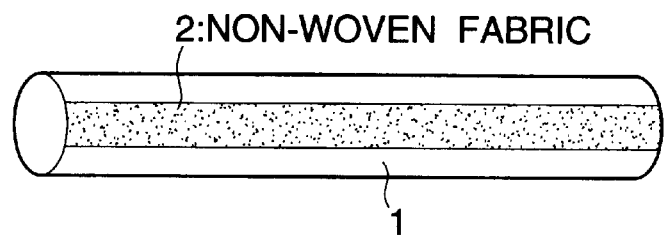
FIG. 1 is a perspective view of a specimen used in Experimental Example 1.

Noise generated at the time of air intake is chiefly caused by a stationary wave of a sound wave generated inside an air intake duct. The frequency of the stationary wave is determined by the air intake duct length, the air intake duct diameter, the air intake duct material, and so on. Therefore, in an air intake duct according to the first aspect of the present invention, a long opening is formed in a part of a duct wall, and the whole of the opening is covered with a porous member such as non-woven fabric or the like. Accordingly, the above-mentioned three operations are performed so that air intake noise is reduced.

The lateral width of the opening is made not shorter than 1/20 of the circumferential length of the duct wall. By disposing the porous member in such a slit-like opening having an elongated shape extended in the longitudinal direction of the duct, the air intake noise can be reduced on a large scale though the reason is unknown. If the lateral width of the opening is shorter than 1/20 of the circumferential length of the duct wall, it becomes difficult to obtain the effect of the disposition of the porous member so that the air intake noise increases. On the other hand, there is no special upper limit in the lateral width of the opening. However, there is little change in the air intake noise reduction effect even if the width is increased, and there is a problem that the cost increases due to the increase of the amount of the porous member. In consideration of a molding step, a porous member bonding step, or the like, as well as the problem of the cost, it is therefore preferable that the actual opening width is made not shorter than about 1/20 and not longer than about 1/4 of the circumferential length of the duct wall.

Further, in an air intake duct in which an opening is formed in a part of the duct wall of a duct body and the opening is covered with non-woven fabric, there is a problem that the loss in intake pressure is larger than that in an air intake duct having no opening and no non-woven fabric. This is because a secondary flow is generated at the time of air intake so as to allow the outside air to pass through the non-woven fabric and flow into the duct body because the non-woven fabric has some degree of air permeability. It is considered that such a secondary flow influences a primary flow which is an air flow sucked from an inlet opening of the duct body, so that the loss in intake pressure increases.

As a result of diligent research, it has become clear that if a small cylindrical portion making the inside of the duct body communicate with the outside thereof was formed in a part of the duct wall of the duct body and the non-woven fabric was disposed at the head of the small cylindrical portion, the loss in intake pressure was reduced. An air intake duct according to the second aspect of the present invention was also developed on the basis of such a discovery.

That is, the air intake duct according to the second aspect of the present invention is constituted by a duct body and a porous member. The duct body is constituted by a large cylindrical portion made of resin, and a small cylindrical portion projecting outward from a part of the duct wall of the large cylindrical portion and having an opening at the head of the small cylindrical portion to thereby make the inside of the large cylindrical portion communicate with the outside of the large cylindrical portion. The porous member is disposed to cover the head of the opening of the small cylindrical portion. With such a configuration, the porous member is offset from the duct body so that the loss in intake pressure can be reduced in comparison with that in an air intake duct which has no small cylindrical portion and in which a porous member is fixed directly to the opening of the side surface of a duct body. The material of the duct body may be selected from some kinds of thermoplastic resins such as PP (polypropylene), high-density PE (polyethylene), PA (polyamide: nylon), etc.

As the height of the small cylindrical portion is made higher, the quantity of reduction of the loss in intake pressure can be increased. That is, when the secondary flow caused by the air entering the small cylindrical portion through the porous member collides with the primary flow, turbulent flow is caused and the turbulent layer affects the primary flow. Thus, it can be considered that as the small cylindrical portion is higher, the influence of the turbulent flow upon the primary flow becomes less, in other words, the time for the turbulent flow to be rectified becomes shorter, so that the loss in intake pressure is made lower. However, about 3 to 10 mm is sufficient for the height of the small cylindrical portion. The small cylindrical portion made too high results in a large convex portion formed in the air intake duct. Thus, there arises a problem in the point of view of space, material cost, or accuracy of the molding surface.

Noise generated at the time of air intake is chiefly caused by a stationary wave of a sound wave generated inside the air intake duct. The frequency of the stationary wave is determined by the air intake duct length, the air intake duct diameter, molding of the air intake duct, and soon. Therefore, according to the present invention, the small cylindrical portion having an opening is formed in a part of the duct wall of the large cylindrical portion, and the opening of the small cylindrical portion is covered with a porous member. Accordingly, the above-mentioned three operations are performed so that air intake noise is reduced.

In the air intake duct according to the second aspect of the present invention, it is preferable that the small cylindrical portion is formed so that the opening thereof has a rectangular or elliptic shape which is long in the longitudinal direction of the large cylindrical portion. It is further desirable from the same point of view of the air intake duct according to the aforementioned first aspect that the actual width of the small cylindrical portion is made to be not shorter than about ¹⁄₂₀ of the circumferential length of the large cylindrical portion and not longer than about ¼ of the circumferential length of the large cylindrical portion.

Hereinafter, common matters between two kinds of air intake ducts according to the first and second aspects are described.

As the longitudinal length of the opening is longer, the air intake noise can be reduced. However, the quantity of the porous member increases so that the problem of the cost increase also expands. In consideration of the balance of the advantage and the disadvantage, it is preferable that the length of the opening is set to be longer than the above-mentioned width of the opening, and to be not longer than about ¼ of the whole length of the duct wall or the large cylindrical portion. More preferably, the length of the opening is set to be substantially ¼ of the whole length of the duct wall or the large cylindrical portion. Incidentally, the length of the opening is a value adjusted suitably in accordance with the air intake quantity required for the engine, the diameter of the air intake duct, the air-flow resistance, and so on.

It is desirable that the longitudinal center of the opening is located in a position of ¼ of the whole length of the duct wall or the large cylindrical portion from an end portion of the duct wall or the large cylindrical portion. Thus, the air intake noise can be made lower. A primary resonant sound of half wavelength as long as the length of the air intake duct, a secondary resonant sound the wavelength of which is as long as the length of the air intake duct, a tertiary resonant sound the wavelength of which is ⅔ of the length of the air intake duct, and so on, are generated in the air intake duct. These resonant sounds form air intake noise. Then, to reduce the resonant sounds, it is preferable that the opening is provided in a position out of the positions corresponding to nodes of the respective sound waves. That is, it is preferable that the longitudinal position of the opening is set to overlap with the antinode position of a generated resonant wave. For example, if the longitudinal center of the opening is located in a position of ¼ of the whole length of the duct wall or the large cylindrical portion from an end portion of the duct wall or the large cylindrical portion, the primary and secondary resonant sounds which will be particularly large in volume can be reduced effectively.

In addition, it is more preferable that the longitudinal center of the opening is located in the position of ¼ of the whole length of the duct wall or the large cylindrical portion from the end portion opposed to an out side air intake port. Thus, the opening can be kept at a distance from the engine so that noise from the engine can be restrained from be heard through the opening and the porous member. Thus, the noise can be further suppressed.

As the porous member, those which are formed of various materials such as fibers, paper, foam, etc. may be used. Particularly, non-woven fabric, woven fabric, knitted fabric, or the like, made of thermoplastic resin is desirable. If non-woven fabric or the like made of thermoplastic resin fibers is used, it can be shaped easily by hot press molding or the like even if the air intake duct has a complicated shape. Thus, the non-woven fabric or the like can be fitted to the shape of the opening easily. In addition, the non-woven fabric can be bonded to the opening of the duct wall or the small cylindrical portion by welding, so that the number of man-hour in the step of covering the opening can be reduced. The thermoplastic resin fibers may form a part of the non-woven fabric, or the non-woven fabric as a whole maybe formed of the thermoplastic resin fibers. Alternatively, a cloth in which non-thermoplastic fibers have been impregnated with a binder made of thermoplastic resin can be also shaped and thermally welded to the opening by hot press molding or the like in the same manner as a cloth formed of thermoplastic resin fibers. Incidentally, to fix the porous member to the opening, a fixation method based on adhesion or mechanical engagement, or the like, as well as thermal welding, may be used.

If the air permeability of the porous member is too high, there is a problem that a sound wave in the air intake duct leaks to the outside through the opening and the porous member so that the noise increases. It is therefore desirable that the degree of the permeability is set so that the quantity of airflow per unit area of a specimen is not higher than 6,000 $m^3/h$ per 1 $m^2$ when the pressure difference is 98 Pa. Incidentally, the quantity of airflow means the quantity of the air per unit time flowing per unit area of a specimen when the difference in pressure between two chambers divided by the specimen is set to be 98 Pa. Of course, the limit of not higher than 6,000 $m^3/h$ per unit area is a limit in the case of the air in which the pressure difference is 98 Pa. If the pressure of air intake is different, it is a matter of course that the numerical value of the limit of the air flow quantity becomes different.

If the air flow quantity exceeds 6,000 $m^3/h$ per 1 $m^2$ when the pressure difference is 98 Pa, a sound wave passing through the opening and the porous member such as non-woven fabric increases so that the transmitted sound becomes louder. On the contrary, if the air flow quantity is zero, the operation of suppressing noise in a low frequency band of not higher than 200 Hz is lowered, but it is possible to suppress noise in comparison with a conventional air intake duct. To form non-woven fabric with the air flow quantity of zero, a film-like skin layer may be formed on the outside surface of the porous member. Although the air flow quantity can be made zero if a skin layer is formed on the inside surface, such a skin layer is not preferable because the reduction of noise based on the aforementioned reason (2) becomes difficult. Incidentally, it is preferable that the air flow quantity in the porous member when the pressure difference is 98 Pa is larger than zero and smaller than 4,300 $m^3/h$, more preferably in a range of larger than 0 and smaller than 3,000 $m^3/h$.

In addition, there is a case where the thickness or properties of the porous member change due to aging, moisture invasion, or the like, so that the balance of transmitted sound passing through the opening and the porous member and outlet sound radiated from the air intake port at the head of the air intake duct is broken to change the performance of suppressing the air intake noise.

It is therefore desirable that the porous member has a function layer to which a predetermined function has been given. Examples of such function layers include a water repellant layer, an anti-clogging layer, etc. For example, non-woven fabric, in which fibers having such a function have been mixed in portions needing the function, can be used. Alternatively, a film having such a function may be laminated on the porous member.

The position of the function layer can be set suitably in the thickness direction of the porous member. For example, in the case where a water repellant layer is used, it is desirable that the water repellant layer is provided in a surface layer or an intermediate layer of the porous member. Thus, moisture is prevented from invading the porous member, so that the properties of the porous member is prevented from changing. Thus, the air intake noise reduction effect can be kept for a long term. In addition, water is also restrained from invading an air cleaner, so that an engine failure caused by the damage of the air permeability of air cleaner elements can be suppressed.

Incidentally, as the method for covering the opening with the porous member, various known methods such as an integral molding method, a heating welding method, a bonding method, a mechanical engagement method, etc. may be adopted. It will go well if the porous member is formed to have an area larger than that of the opening and cover it. From the point of view of the cost, however, it is desirable that the porous member is formed to cover the whole of the opening with an area as small as possible, that is, substantially as large as that of the opening.

In the method for manufacturing the air intake duct according to the second aspect of the present invention, there is formed a duct body constituted by a large cylindrical portion made of resin and a small cylindrical portion projecting outward from a part of the duct wall of the large cylindrical portion and having an opening at the head of the small cylindrical portion to thereby make the inside of the large cylindrical portion communicate with the outside of the same. In this formation, the large cylindrical portion may be manufactured as a pair of half shapes by injection molding or press molding. In such a case, the half shapes are integrated thereafter. However, the large cylindrical portion is preferably manufactured by blow molding. According to the blow molding, a molded article constituted by the large cylindrical portion and the small cylindrical portion is formed integrally by blow molding. After mold release, the opposite ends of the large cylindrical portion and the head of the small cylindrical portion are cut off. Thus, the duct body in the present invention can be manufactured easily. As the material of the duct body, various kinds of thermoplastic resins such as PP, high-density PE, PA, etc. can be used selectively.

A porous member containing a thermoplastic material is thermally welded to cover the opening of the small cylindrical portion. As the method of thermal welding, a known welding method such as a hot plate welding method, a vibration welding method, or the like, may be used. For example, the porous member may be welded with the end surface of the opening merely formed by cutting off the head of the small cylindrical portion.

However, it is necessary to bring the both into pressure contact with each other at the time of the thermal welding. If the rigidity of the large cylindrical portion is low, the large cylindrical portion may be deformed by the applied pressure so that the welding becomes uneven. It is therefore desirable that a flange portion is formed at the head of the small cylindrical portion in advance. Thus, a reception jig is inserted between the duct wall of the large cylindrical portion and the flange portion so that pressure can be applied to the porous member and the flange portion by a pressure jig and the reception jig. As a result, since the applied pressure can be prevented from being transmitted to the large cylindrical portion, thermal welding can be performed while preventing the large cylindrical portion from deformation.

As the porous member, that which can be thermally welded and which has predetermined air permeability and flexibility may be used. However, non-woven fabric, woven fabric, knitted fabric, or the like, formed of thermoplastic fibers, is particularly preferable. If non-woven fabric or the like made of thermoplastic resin fibers is used, it can be shaped easily by hot press molding or the like even if the air intake duct has a complicated shape. Thus, the non-woven fabric or the like can be fitted to the shape of the opening easily. Incidentally, the thermoplastic resin fibers may form a part of the non-woven fabric, or the non-woven fabric as a whole may be formed of the thermoplastic resin fibers. Alternatively, a cloth in which non-thermoplastic fibers have been impregnated with a binder made of thermoplastic resin can be also shaped by hot press molding or the like and thermally welded to the opening in the same manner as a cloth formed of thermoplastic resin fibers.

The present invention will be described below specifically by Embodiments and Experimental Examples.

EXPERIMENTAL EXAMPLE 1

A part of the duct wall of a straight tubular pipe 1 made of high-density polyethylene and having an inner diameter of 65 mm and a length of 650 mm was cut off like a slit over the whole of the longitudinal length of the duct wall. Non-woven fabric 2 (unit weight 1,000 g/m², thickness-direction air permeability 160 to 190 m³/h) made of PET (polyethylene terephthalate) was bonded with the duct wall at the cut-off portion so as to form a specimen shown in FIG. 1. Thus, various kinds of specimens were formed with the circumferential length (width) of the cut-off portion in a range of from 0% (no cut-off portion) to 100% (the whole of the pipe was of non-woven fabric)

Figure 2:
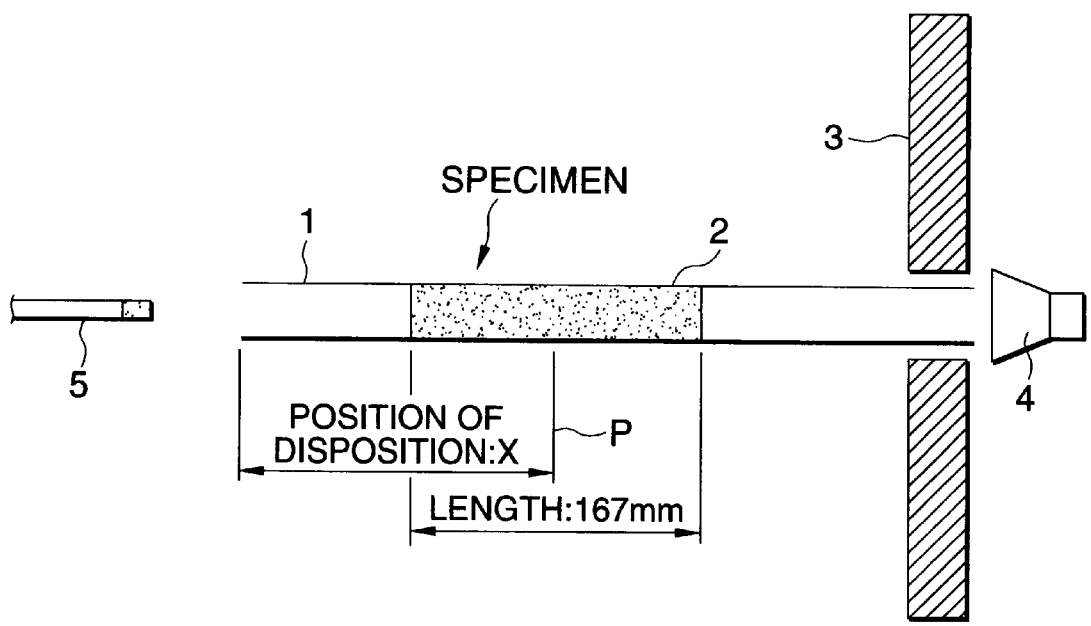
FIG. 2 is an explanatory view showing the configuration of a test apparatus used in Experimental Examples 1 and 2.

Next, the sound absorbing properties of each of the aforementioned specimens were tested by use of a test apparatus shown in FIG. 2. In this test apparatus, each specimen as a whole was disposed in a soundproof chamber while one end of the specimen was made to penetrate a sound barrier wall 3. A speaker 4 was disposed in the vicinity of the end of the specimen penetrating the sound barrier wall 3 while a microphone 5 was disposed in a position 10 mm distant from an opening at the other end of the specimen. Incidentally, FIG. 2 shows a specimen manufactured in Experimental Example 2 which will be described later.

Figure 3:
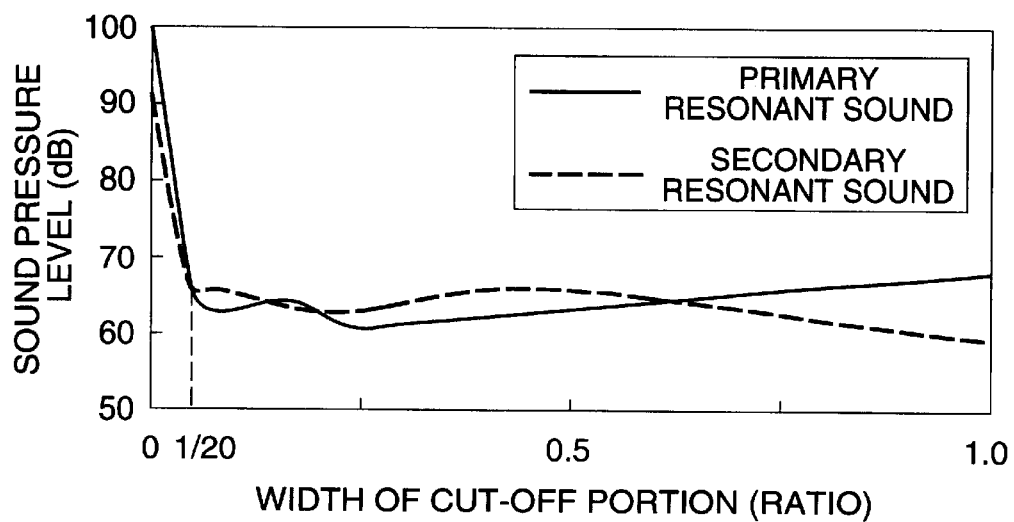
FIG. 3 is a graph showing the results of Experimental Example 1, and illustrating the relationship between the width of a cut-off portion and the sound pressure level.

White noise was generated from the speaker 4, and the sound pressure level of an outlet sound coming out of the opening at the other end of the specimen was measured by the microphone 5 with respect to the primary and secondary resonant sounds respectively. FIG. 3 shows the results.

It is apparent from FIG. 3 that the sound pressure level decreases suddenly from the specimen in which the circumferential length (width) of the cut-off portion is zero to the specimen in which the circumferential length of the cut-off portion is ½₀ of the whole circumference of the pipe 1. The sound pressure level is kept at a low value in the specimens in which the circumferential length of the cut-off portion is not shorter than ½₀ of the whole circumference of the pipe 1. It is therefore understood that it is desired to make the circumferential length of the cut-off portion not shorter than ½₀ of the whole circumference of the pipe 1.

EXPERIMENTAL EXAMPLE 2

Figure 4:
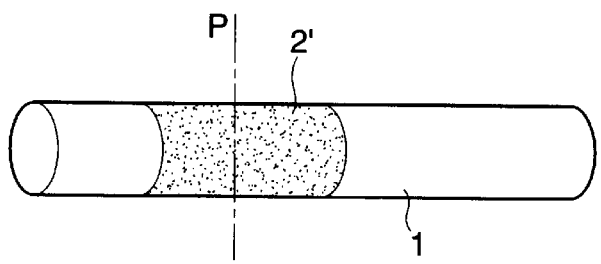
FIG. 4 is a perspective view of a specimen used in Experimental Example 2.
Figure 5:
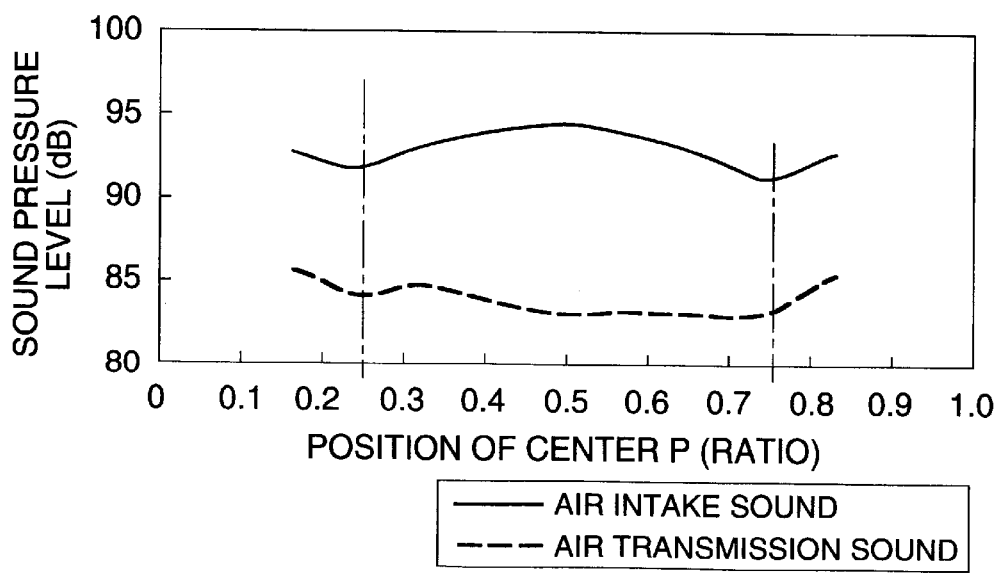
FIG. 5 is a graph showing the results of Experimental Example 2, and illustrating the relationship between the position of the center of the cut-off portion and the sound pressure level.

Next, the duct wall of a pipe 1 made of high-density polyethylene and having an inner diameter of 65 mm and a length of 650 mm was cut off by the length of 100 mm. A non-woven fabric cylinder 2' (unit weight 1,000 g/m², thickness 3.5 mm, air permeability 16,800 m³/h m²) made of PET (polyethylene terephthalate) and having an inner diameter of 65 mm and a length of 167 mm was bonded to the cut-off portion of the pipe 1 so as to form a specimen shown in FIG. 4. Thus, various kinds of specimens were formed by variously changing the distance (X in FIG. 2) between the axially center position (P) of the cut-off portion and an end surface of the pipe 1. Upon each of the specimens, the sound pressure level of an outlet sound was measured in the same manner as in Experimental Example 1. Incidentally, the microphone 5 was disposed on the side surface of each of the specimens so as to also measure a sound transmitted through the non-woven fabric cylinder 2'. FIG. 5 shows the results by overall values.

It is understood from FIG. 5 that a minimum value is recognized when the longitudinal center (P) of the cut-off portion is located in a position of ¼ of the whole length of the duct wall from an end portion of the duct wall, and it is particularly desired that the longitudinal center (P) is set in the position of ¼ of the whole length of the duct wall.

Thus, in consideration of the results of both the Experimental Examples, an air intake duct of Inventive Example was formed as follows.

Embodiment 1

Figure 6:
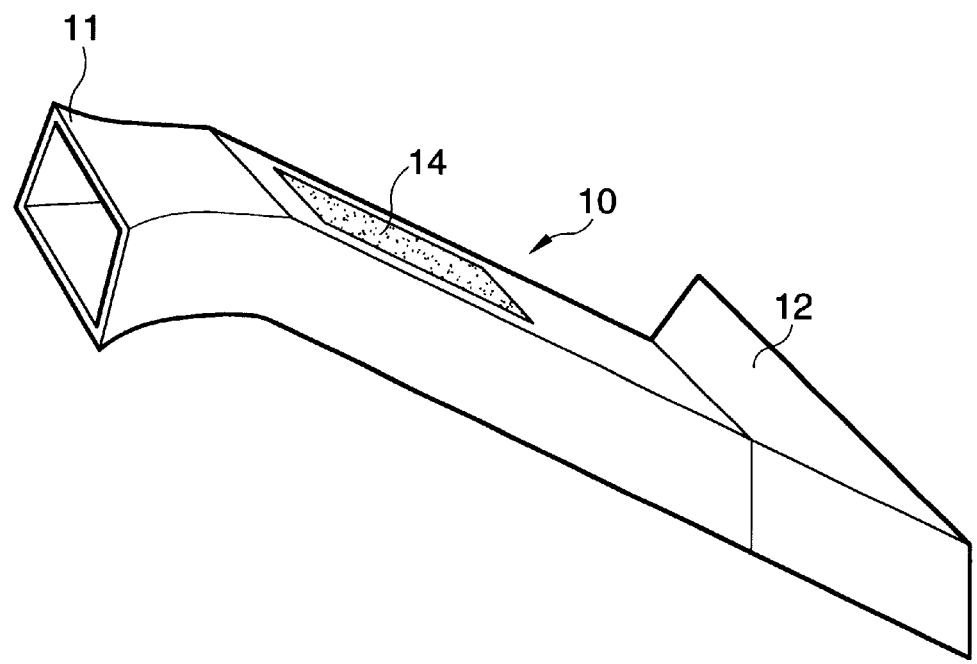
FIG. 6 is a perspective view of an air intake duct according to a first embodiment of the present invention.
Figure 7:
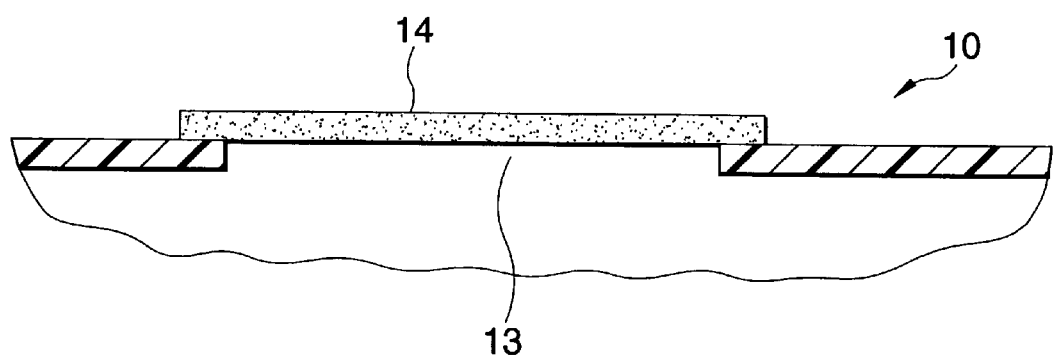
FIG. 7 is a main portion sectional view of the air intake duct according to the first embodiment of the present invention.

FIGS. 6 and 7 show an air intake duct 10 according to a first embodiment of the present invention. The air intake duct 10 is formed like a cylinder having an inlet end portion 11 disposed in an outside air intake port of a motor car, and an outlet end portion 12 fixed to an intake manifold of an engine. An opening 13 in the longitudinal direction of the air intake duct 10 is formed in one side surface on the inlet end portion 11 side. The opening 13 is covered with non-woven fabric 14. The air intake duct 10 is formed of high-density polyethylene by blow molding. A part of the air intake duct 10 molded thus is cut out to form the opening 13.

The circumferential length, which is a lateral width, of the opening 13 is set to be ¼ of the general circumferential length of the air intake duct 10 while the length of the opening 13 is set to be ¼ of the whole length of the air intake duct 10. Thus, the opening 13 is formed like a slit. In addition, the longitudinal center of the opening 13 is located in a position of ¼ of the whole length of the air intake duct 10 from the inlet end portion 11.

The non-woven fabric 14 is made of non-woven fiber fabric (unit weight 1,000 g/m², thickness 3.5 mm, air permeability 1,680 m³/h·m²) made of PET (polyethylene terephthalate). The non-woven fabric 14 is cut out into a shape which is larger in size than the opening 13, and integrated with the air intake duct 10 by thermal welding so as to cover the opening 13.

Upon the air intake duct 10 in this first embodiment and an air intake duct of an comparative example which did not have the opening 13 and which was formed of high-density polyethylene as a whole, the sound pressure level was measured by use of a test apparatus similar to that used in Experimental Examples and in the same manner as in the Experimental Examples, respectively. As a result, the sound pressure level of an air intake sound in the air intake duct 10 in this first embodiment was reduced by about 70% in comparison with that in the air intake duct in the comparative example. Thus, the air intake noise could be reduced on a large scale.

Embodiment 2

Figure 8:
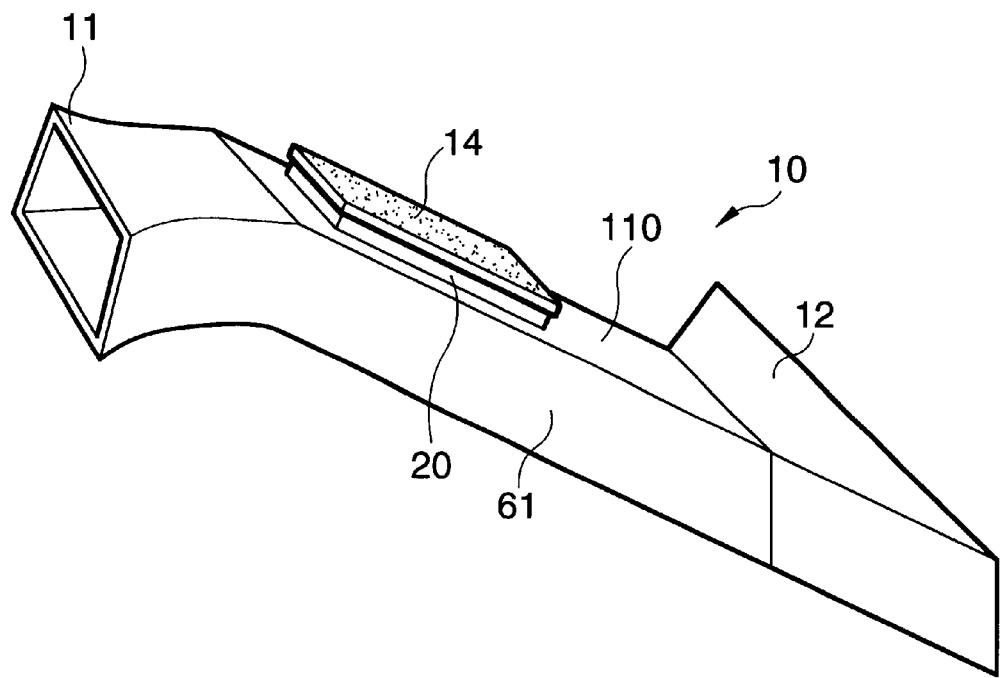
FIG. 8 is a perspective view of an air intake duct according to a second embodiment of the present invention.
Figure 9:
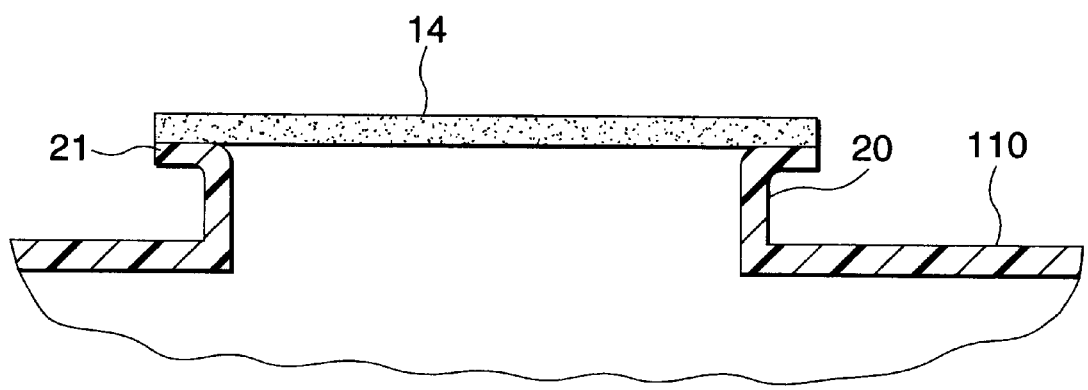
FIG. 9 is a main portion sectional view of the air intake duct according to the second embodiment of the present invention.

FIGS. 8 and 9 show an air intake duct according to another embodiment of the present invention. The air intake duct 10 is constituted by a duct body 61 and non-woven fabric 14. The duct body 61 is constituted by a large cylindrical portion 110 and a small cylindrical portion 20.

The large cylindrical portion 110 has an inlet end portion 11 disposed in an outside air intake port of a motorcar, and an outlet end portion 12 fixed to an intake manifold of an engine. The small cylindrical portion 20 projects from one side surface on the inlet end portion 11 side so as to make the inside of the large cylindrical portion 110 communicate with the outside of the same. The non-woven fabric 14 is thermally welded with a flange portion 21 so as to cover an opening of the small cylindrical portion 20. The flange portion 21 is provided in the circumferential edge portion of the opening of the small cylindrical portion 20.

The circumferential length (width) of the small cylindrical portion 20 is set to be ⅕ of the general circumferential length of the large cylindrical portion 110. The length of the small cylindrical portion 20 is set to be ¼ of the whole length of the large cylindrical portion 110. The opening of the small cylindrical portion 20 is formed into a rectangular shape. In addition, the longitudinal center of the small cylindrical portion 20 is located in a position of ¼ of the whole length from the inlet end portion 11.

A method for manufacturing the air intake duct will be described below in place of detailed description of the configuration thereof.

Figure 10:
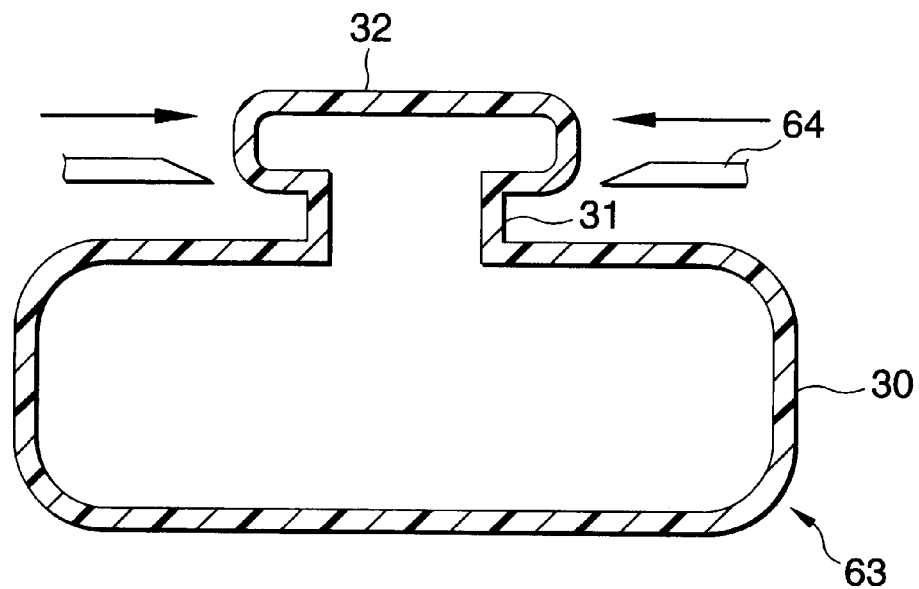
FIG. 10 is a sectional view of a blow-molded body which is formed in a manufacturing method according to the present invention, which is an explanatory view showing the cutting position thereof.

First, a parison made of high-density PE is introduced into a molding mold. A molded body 63 shown in FIG. 10 is formed by blow molding. This molded body 63 is constituted by a large-diameter portion 30 as the large cylindrical portion 110, a neck portion 31 as the small cylindrical portion 20 swelling from a part of the duct wall of the large diameter portion 30, and a head portion 32 swelling from the head of the neck portion 31.

Figure 11:
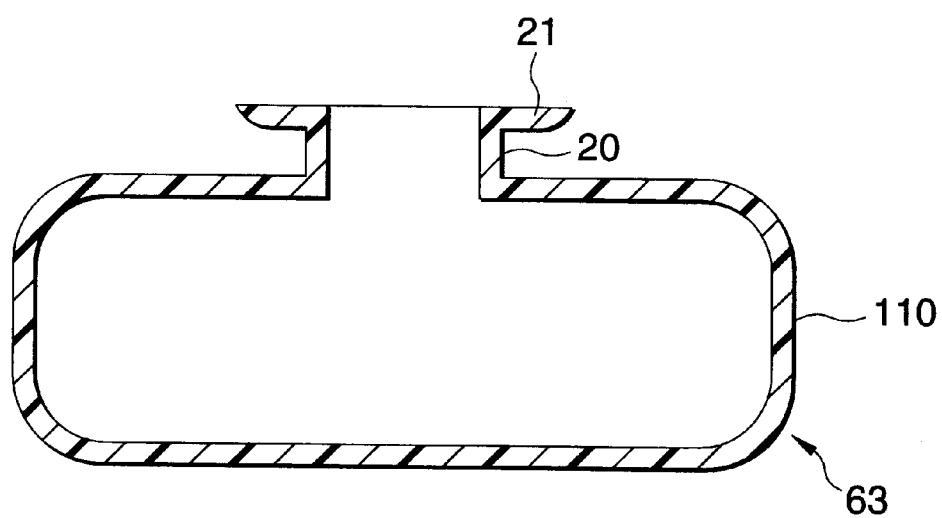
FIG. 11 is a sectional view of the blow-molded body which is formed in the manufacturing method according to the present invention, and in which unnecessary portions have been cut out.

Next, by use of a cutting tool 64, the opposite ends of the large diameter portion 30 are cut off while the head portion 32 is cut out in the vicinity of the neck portion 31. Thus, as shown in FIG. 11, the large cylindrical portion 110 and the small cylindrical portion 20 are formed while the flange portion 21 is formed at the head of the small cylindrical portion 20.

On the other hand, non-woven fabric (unit weight 700 g/m², thickness 1.5 mm, and air permeability 3,500 m³/h·m²) made of PET (polyethylene terephthalate) is cut off into a predetermined shape, and shaped into another predetermined shape by hot press if necessary. Thus, the non-woven fabric 14 is prepared. The non-woven fabric 14 contains 30 wt % of binder fibers made of low-melting PET fibers.

Figure 12:
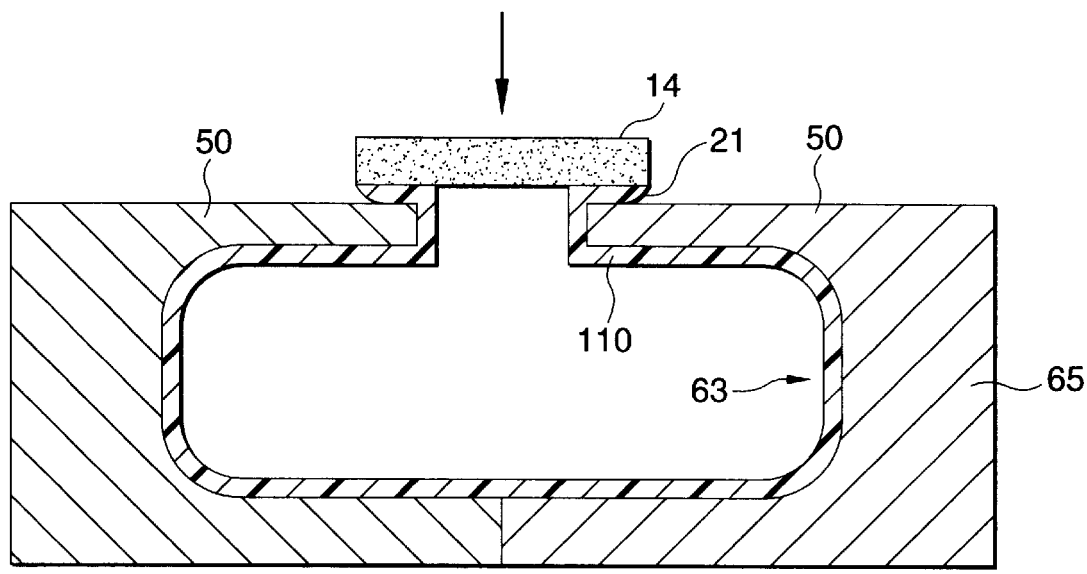
FIG. 12 is a sectional view showing a state of thermal welding in the manufacturing method according to the present invention.

The molded body 63 in which unnecessary portions have been cut out is disposed in a reception jig 65 as shown in FIG. 12. The reception jig 65 has a plate-like reception portion 50. The reception portion 50 is inserted between the large cylindrical portion 50 and the flange portion 21. In that condition, a not-shown hot plate is brought into contact with the surface of the flange portion 21. Immediately after the flange portion is put on the flange portion 21. Then, a not-shown pressure member presses the non-woven fabric 14 onto the flange portion 21 in the arrow direction.

At this time, the flange portion 21 is supported by the reception portion 50. Therefore, pressure is applied to the non-woven fabric 14 and the flange portion 21 by the pressure member and the reception portion 50 while the applied pressure is not transmitted to the large cylindrical portion 110. Thus, since the large cylindrical portion 110 is prevented from deformation, the non-woven fabric 14 is welded with the flange portion 21 uniformly with high welding strength. After the welding, the reception jig 65 is removed. Thus, the air intake duct according to this embodiment is obtained.

Figure 13:
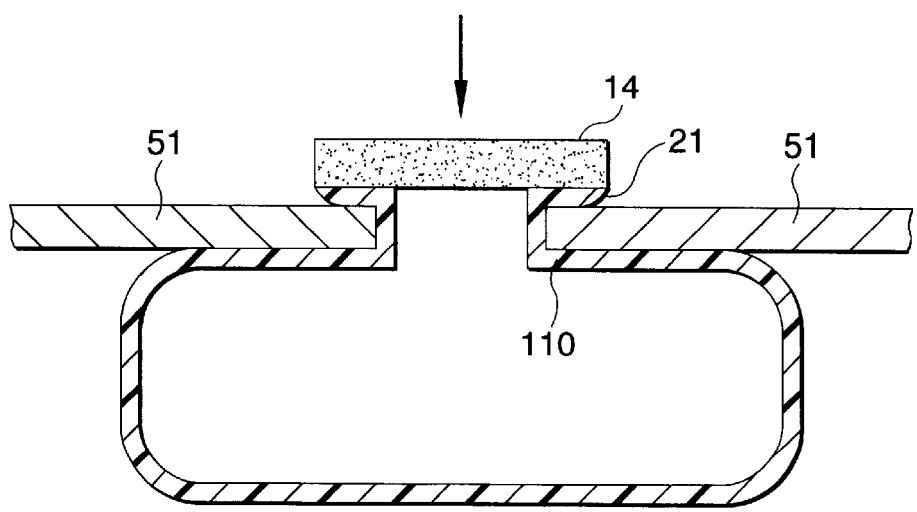
FIG. 13 is a sectional view showing another state of thermal welding in the manufacturing method according to the embodiment of the present invention.

Incidentally, although the large cylindrical portion 110 is also disposed in the reception jig 65 in this embodiment, a plate-like reception jig 51 having rigidity may be inserted between the large cylindrical portion 110 and the flange portion 21 as shown in FIG. 13. Not to say, in this case, such thermal welding has a similar operation/effect.

A comparative example was formed in the same manner as that in the embodiment, except that the air intake duct was constituted by only the large cylindrical portion 110 without having the small cylindrical portion 20 and the non-woven fabric 14. The air intake duct according to this embodiment and the air intake duct according to the comparative example were disposed between an outside air intake port of a motorcar and an intake manifold of an engine so as to measure the sound pressure level of air intake sound in the outside air intake port. As a result, the sound level of the air intake sound in the air intake duct in this embodiment was lower than that in the air intake duct in the comparative example by about 8 dB. Thus, air intake noise could be reduced on a large scale.

EXPERIMENTAL EXAMPLES 3

Air intake ducts were formed in the same manner as in the embodiment, while setting the height of the neck portion 31 to be 0, 3, 5, 7 and 10 mm, respectively. In the air intake duct in which the height of the neck portion 31 (height of the small cylindrical portion 20) was 0 mm, the non-woven fabric 14 was welded to the opening formed directly in the large cylindrical portion 110. In addition, another air intake duct was prepared, which was similar, except that it did not have the small cylindrical portion 20 and the opening, that is, it was constituted by only the large cylindrical portion 110.

Loss in intake pressure when the air was introduced into each of the air intake ducts by the air flow quantity of 6 m³/min was measured. Table 1 shows the results by relative values (%) with respect to the value when the height of the small cylindrical portion 20 was 0 mm.

TABLE 1

| | Small cylindrical portion height and intake pressure loss (relative value) | | | | | |
|---|---|---|---|---|---|---|
| air flow (m³/min) | no small cylindrical portion | 0 mm | 3 mm | 5 mm | 7 mm | 10 mm |
| 6 | 85.3 | 100 | 96.4 | 94.9 | 93.2 | 92.1 |

As is apparent from Table 1, the loss in intake pressure increases when the opening is provided and covered with the non-woven fabric 14. However, it is understood that if the small cylindrical portion 20 is formed and the height thereof is set to be higher, the loss in intake pressure becomes lower. Therefore, it will go well if the height of the small cylindrical portion 20 is selected to satisfy an allowable loss in intake pressure.

Next, a method for welding resin molded pieces with each other by use of a hot plate is described with reference to FIGS. 14 and 15. As hereinafter described, this method is applicable to manufacturing aforementioned air intake ducts. That is, in the step, non-woven fabric is welded with the opening provided in a part of the duct wall of the air intake duct body. While the specific method hereinafter described is referred to manufacturing the aforementioned air intake duct according to the first aspect of the present invention, the following method and machine are also applicable to manufacturing the aforementioned air intake duct according to the second aspect.

Figure 14:
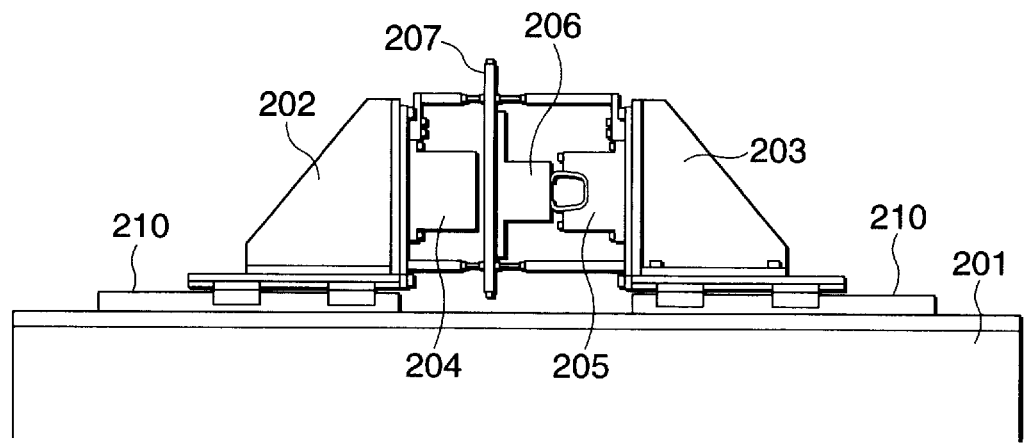
FIG. 14 is a whole front view of a hot plate welder used in the present invention.
Figure 15:
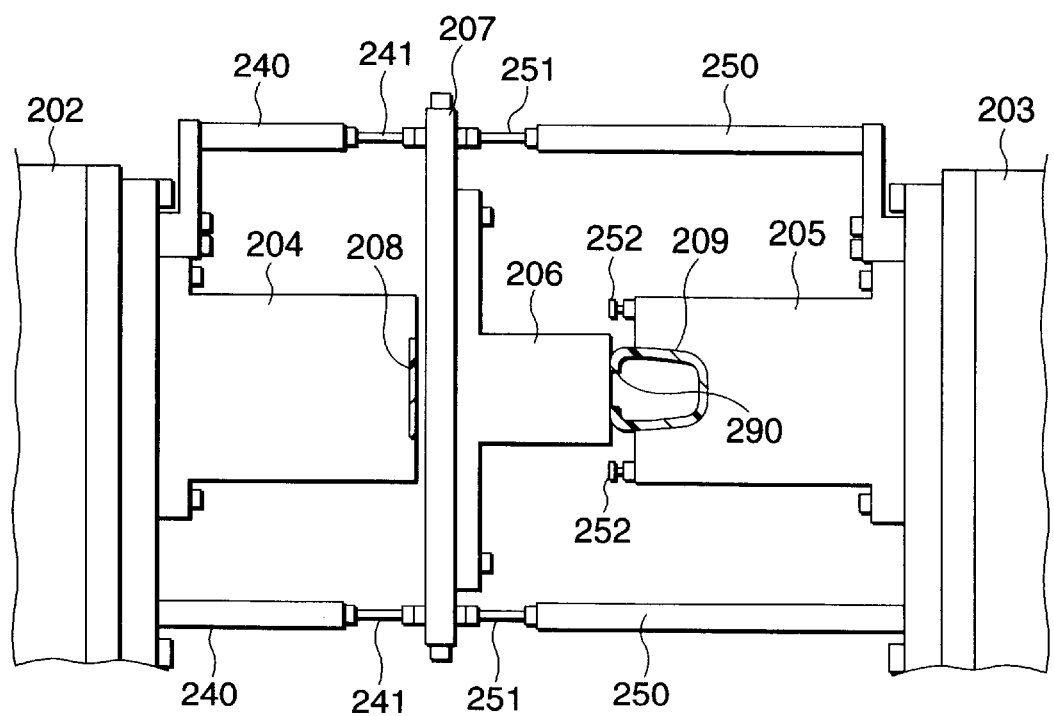
FIG. 15 is a front view showing the state where pieces to be welded are heated by a hot plate by use of the hot plate welder used in the present invention.

FIGS. 14 and 15 show a hot plate welder used in this embodiment. This hot plate welder is constituted by a base table 201, left and right slide blocks 202 and 203 supported on the base table 201 movably in the left and right respectively, a left reception jig 204 retained by the left slide block 202, a right reception jig 205 retained by the right slide block 203, a hot plate block 206 retained movably forward/backward perpendicularly to the paper surfaces of FIGS. 14 and 15, and a hot plate 207 fixed to the hot plate block 206.

A rail 210 is fixed to the top surface of the base table 201. The left and right slide blocks 202 and 203 are guided by the rail 210 so as to be movable in the left/right direction respectively. Then, the left and right reception jigs 204 and 205 are removably retained by the left and right slide blocks 202 and 203 respectively so as to be in opposition to each other.

In addition, stoppers 240 and 250 project from the left and right reception jigs 204 and 205 respectively so as to be opposed to each other. Bolts 241 and 251 are provided at the heads of the stoppers 240 and 250 so as to be screwed down thereto respectively. The heads of the bolts 241 and 251 abut against the hot plate 207. Thus, the distances between the left and right reception jigs 204 and 205 and the hot plate 207 can be adjusted by the distances with which the bolts 241 and 251 are screwed down to the stoppers 240 and 250, respectively.

With the aforementioned hot plate welder, welding is performed as follows.

A felt 208 as a non-woven fabric made of PET fibers of a melting point of 160° C. and molded into a predetermined shape is retained in the left reception jig 204. The distance between the surface of the felt 208 and the surface of the hot plate 207 is adjusted to be 5 mm by the bolts 241.

On the other hand, a cylindrical air intake duct body 209 is retained by the right reception jig 205. This air intake duct body 209 is formed of PP of a melting point of 165° C. by blow molding. A window portion 290 is formed in a part of the duct wall of the air intake duct body 209. The distance between the surface of the circumferential edge portion of the window portion 290 and the surface of the hot plate 207 is adjusted to be zero by the bolts 251. That is, the circumferential edge portion of the window portion 290 is adjusted to abut against the hot plate 207.

First, the felt 208 and the air intake duct body 209 are retained by the left and right reception jigs 204 and 205 respectively as described above. The left and right slide blocks 202 and 203 are moved in directions in which they go away from each other, respectively. Next, a current is made to flow in the hot plate 207 so that the hot plate 207 is heated to 260° C. While the hot plate 207 is kept at a fixed temperature, the left and right slide blocks 202 and 203 are moved in directions in which they approach each other, respectively. Then, both the stoppers 240 and 250 abut against the hot plate 207 so that the left and right slide blocks 202 and 203 are restrained from moving. In such a condition, the felt 208 and the air intake duct body 209 are heated by the hot plate 207.

Since the surface of the felt 208 is distant by 5 mm from the surface of the hot plate 207, the surface of the felt 208 is heated by radiation heat from the hot plate 207. On the other hand, the circumferential edge portion of the window portion 290 of the air intake duct body 209 abuts against the hot plate 207 so as to be heated directly by the hot plate 207. When the circumferential edge portion of the window portion 290 is heated to melt sufficiently in such a condition, the felt 208 reaches about 100° C. Thus, the felt 208 is heated to a temperature which is high enough to be welded but which is too low to be softened.

Then, the left and right slide blocks 202 and 203 are moved slightly so as to go away from each other, while the hot plate block 206 is moved backward perpendicularly to the paper surface so as to make the hot plate 207 disappear from a space between the left and right reception jigs 204 and 205. Immediately the left and right slide blocks 202 and 203 are moved to approach each other, so that the felt 208 and the air intake duct body 9 are brought into pressure contact. At this time, the respective heads of the bolts 252 screwed down to the right slide block 205 so as to project from the block 205 abut against the surface of the left slide block 204. Thus, the left and right slide blocks 202 and 203 are restrained from moving. Therefore, the pressure contact margin is determined by the projecting length of the bolts 252.

Thus, the fibers of the felt 208 are impregnated with the molten resin of the circumferential edge portion of the window portion 290. The felt 208 is so warm that the impregnating molten resin is restrained from being cooled. Therefore, when the molten resin is cooled in the condition that the felt 208 is impregnated with the molten resin sufficiently, the felt 208 is firmly welded with the circumferential edge portion of the window portion 290 of the air intake duct body 209.

The felt 208 is welded with the circumferential edge portion of the window portion 290, and most of the felt 208 covers the opening of the window portion 290. Since the felt 208 was not heated to be high enough to be softened, the felt 208 keeps its predetermined shape without deformation. In addition, predetermined air permeability is kept in the portion covering the opening of the window portion 290. Accordingly, in the air intake duct obtained by this embodiment, air intake noise is suppressed effectively.

Incidentally, in the case where the material of the felt 208 is changed, it will cope with such a case easily if the distance with which the bolts 241 are screwed down is adjusted to change the distance between the felt 208 and the hot plate 207.

Figure 16:
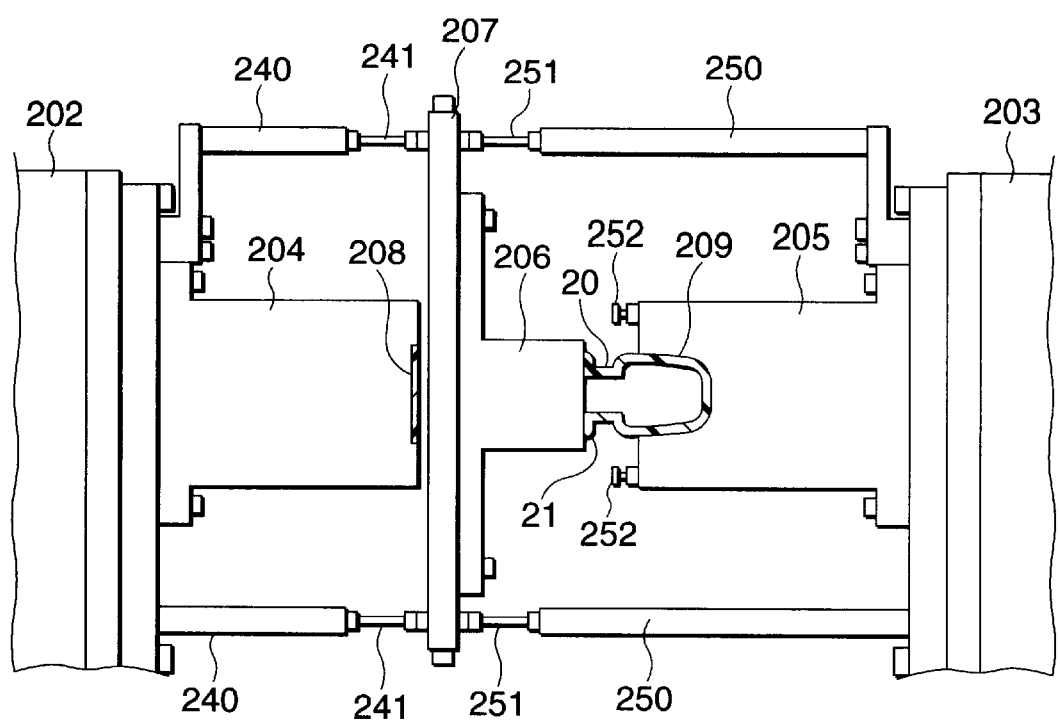
FIG. 16 is a front view showing the state where pieces to be welded are heated by a hot plate by use of the hot plate welder used in the present invention.
Figure 17:
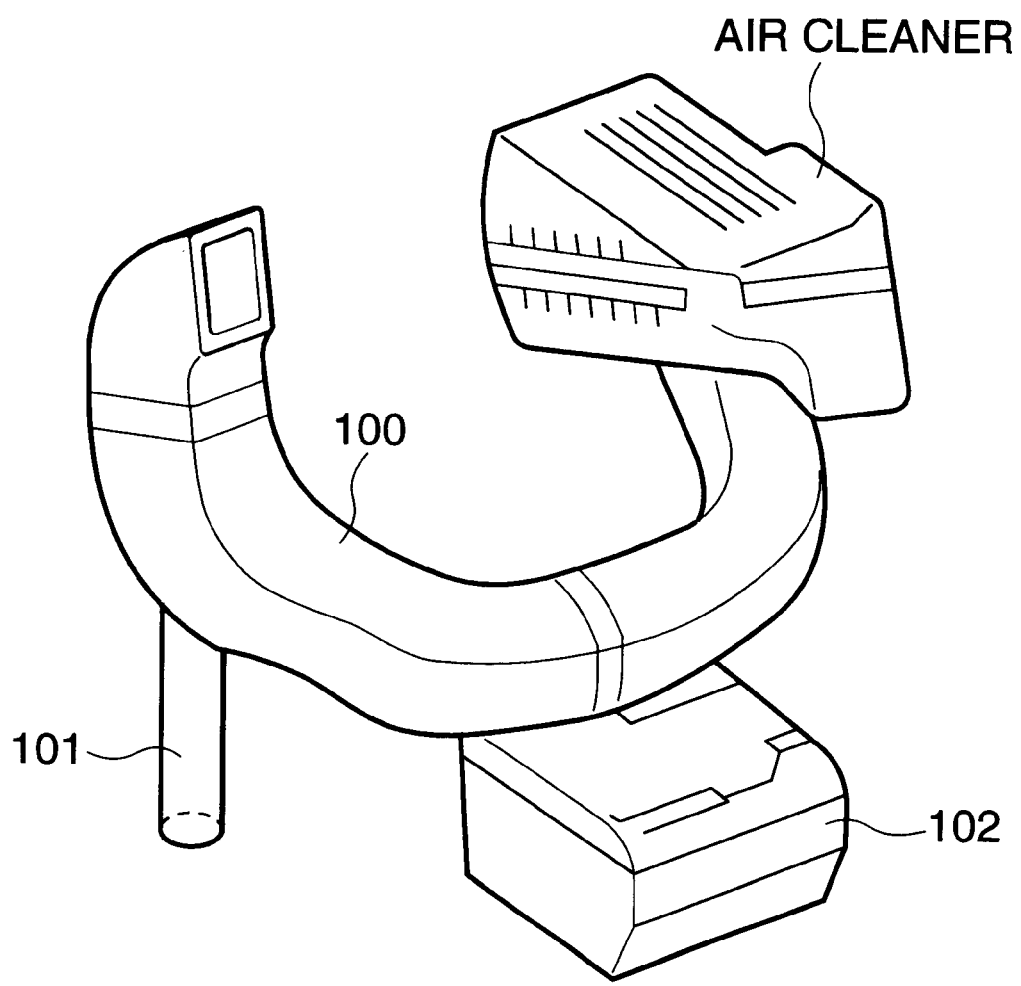
FIG. 17 is a perspective view of a conventional air intake duct.
Figure 18:
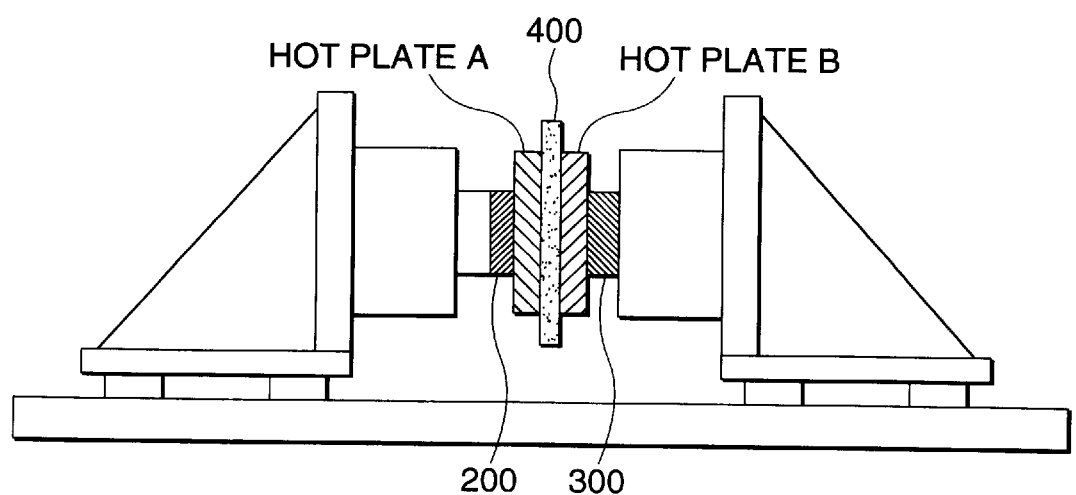
FIG. 18 is a front view showing a conventional hot plate welding method and illustrating the state where pieces to be welded are heated by hot plates by use of a conventional hot plate welder.

The aforementioned method for welding resin molded pieces is used for manufacturing the air intake duct 10 shown in FIGS. 6 and 7. However, this method is applicable also for manufacturing the air intake duct 10 shown in FIGS. 8 and 9. As shown in FIG. 16, the air intake duct body 209 having the small cylindrical portion 20 and the flange portion 21 is prepared through the steps in FIGS. 10 and 11, and the body 209 is welded with the felt 208 in the same manner as aforementioned. As a result, the air intake duct 10 in FIGS. 8 and 9 is manufactured.

As described above, air intake noise in the air intake duct according to the present invention can be reduced while the loss in intake pressure is restrained from increasing. In addition, the usage of non-woven fabric or the like is reduced. Thus, the air intake duct is extremely low in price.

In addition, the air intake duct can be manufactured with a small number of man-hour, and a porous member of non-woven fabric or the like can be welded with high welding strength.

Further, according to the hot plate welding method of the present invention, molded pieces different in melting point can be welded by one hot plate. Thus, the size of a welder can be reduced, and the space for installing the welder can be reduced. It is therefore possible to reduce the manufacturing cost.

Then, if the present invention is applied to welding between an air intake duct body made of resin and non-woven fabric made of resin, the welding can be achieved without damaging the air permeability of the non-woven fabric. Thus, it is possible to manufacture an air intake duct at low cost and with reduced air intake noise.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An air intake duct, comprising:
   a duct body having a duct wall;
   an opening formed in a predetermined portion of said duct wall, said opening extending in a longitudinal direction of said duct wall; and
   a porous member covering said opening and being one of a non-woven fabric, a woven fabric, and a knitted fabric;
   wherein said opening has a lateral width which is greater than 1/20 of a circumferential length of said duct wall.

2. An air intake duct according to claim 1, wherein a longitudinal position of said opening is set to overlap with an antiode of a resonant wave propagating through the duct body.

3. An air intake duct according to claim 1, wherein a longitudinal center of said opening is located in a position of 1/4 of whole length of said duct wall from an inlet end portion of said duct wall.

4. An air intake duct according to claim 1, wherein said opening has the lateral width which is less than 1/4 of the circumferential length of said duct wall.

5. An air intake duct according to claim 1, wherein the fabric is formed of one of thermoplastic fibers and non-thermoplastic fibers impregnated with a thermoplastic resin binder.

6. An air intake duct, comprising:
   a duct body including a large cylindrical portion and a small cylindrical portion projecting outward from a part of said large cylindrical portion, said small cylindrical portion having an opening formed at a head thereof that communicates an inside of said large cylindrical portion with an outside of said large cylindrical portion; and
   a porous member covering said opening of said small cylindrical portion and being one of a non-woven fabric, a woven fabric, and a knitted fabric.

7. An air intake duct according to claim 6, wherein a longitudinal position of said opening is set to overlap with an antiode of a generated resonant wave.

8. An air intake duct according to claim 6, wherein a longitudinal center of said opening is located in a position of 1/4 of whole length of said large cylindrical portion from an inlet end portion of said large cylindrical portion.

9. An air intake duct according to claim 6, wherein said opening has a lateral width which is greater than 1/20 and less than 1/4 of a circumferential length of said large cylindrical portion.

10. An air intake duct according to claim 6, wherein said small cylindrical portion has a height of 3 to 10 mm.

11. An air intake duct according to claim 6, further comprising a flange portion formed at said head of said small cylindrical portion.

12. An air intake duct according to claim 6, wherein the fabric is formed of one of thermoplastic fibers and non-thermoplastic fibers impregnated with a thermoplastic resin binder.

13. A method for manufacturing an air intake duct, comprising:

forming a duct body including a large cylindrical portion and a small cylindrical portion projecting outward from a part of said large cylindrical portion, said small cylindrical portion having an opening formed at a head thereof to communicate an inside of said large cylindrical portion with an outside of said large cylindrical portion; and thermally welding a porous member containing a thermoplastic material with said small cylindrical portion to cover said opening.

14. A method for manufacturing an air intake duct according to claim 13, further comprising:

forming a flange portion at said head of said small cylindrical portion;

inserting a reception jig between said large cylindrical portion and said flange portion; and pressurizing said porous member and said flange portion by a pressure jig and said reception jig so that said porous member is thermally welded with said flange portion.

15. A method for manufacturing an air intake duct according to claim 13, wherein said duct body is formed of a resin having a melting point higher than that of said porous member, said method further comprising:

providing a hot plate heated to a temperature not lower than the melting point of said duct body;

bringing a joint surface of said duct body into contact with one surface of said hot plate to thereby heat said joint surface of said duct body;

disposing said porous member in opposition to the other surface of said hot plate and away from said other surface to thereby heat a joint surface of said porous member by radiation heat from said hot plate; and bringing said porous member and said duct body into pressure contact with each other in a condition that at least said joint surface of said duct body is melted, so that said porous member and said duct body are welded with each other.

16. A method for manufacturing an air intake duct according to claim 15, wherein said porous member is a fabric formed of fibers, and said fabric is impregnated with the molten resin in said joint surface of said duct body.

17. A method for manufacturing air intake duct according to claim 16, wherein the fabric is one of non-woven fabric, woven fabric and knitted fabric.

* * * * *